July 24, 1962    R. H. LUPPOLD, JR    3,046,461
ELECTRONIC CONTROLS WITH REVERSING SHADE POLE MOTORS
Filed Jan. 2, 1958    6 Sheets-Sheet 1

Fig. 4

July 24, 1962  R. H. LUPPOLD, JR  3,046,461
ELECTRONIC CONTROLS WITH REVERSING SHADE POLE MOTORS
Filed Jan. 2, 1958  6 Sheets-Sheet 6

FIG. 12

INVENTOR
Robert H. Luppold Jr.
BY Gerald B. Hoflat
His attorney

United States Patent Office 3,046,461
Patented July 24, 1962

3,046,461
ELECTRONIC CONTROLS WITH REVERSING SHADE POLE MOTORS
Robert H. Luppold, Jr., West Newton, Pa., assignor to Hagan Chemicals and Controls Incorporated, Pittsburgh, Pa., a corporation of Pennsylvania
Filed Jan. 2, 1958, Ser. No. 706,643
5 Claims. (Cl. 318—208)

This invention relates to electronic devices comprising an electronic amplifier having an electric input means reflecting a variable condition and a feed-back potentiometer in circuit with the input means and reversing motor energized by the amplifier output for driving the feed-back potentiometer.

An object of this invention is to provide an electronic device of the character stated supra having output plug and socket and variable condition input plug and socket assemblies which, by means of the former, the potentiometer driving motor may be connected to the output of the amplifier and the input plug and socket assembly, and which by means of the latter, the fixed elements of a Wheatstone bridge, either A.C. or D.C., or a potentiometer may be compactly housed and provided with terminals whereby the variable parts of the bridge including the feed-back potentiometer may be connected to the input plug and socket assembly.

Another object is to provide an input box for an amplifier having a reversing feed-back potentiometer drive motor provided with a separately excited A.C. main field winding and reversing coil windings, characterized by the fact that the coil windings are connected directly to the plate circuit of the output tube of the amplifier as the load impedance thereof.

A further object of the invention is to provide an electronic circuit having a grid controlled output tube and a reversing motor provided with a main field winding and rotation direction control field coil windings, the latter being connected in parallel circuit with a condenser and connected directly to the plate circuit of the tube to form the load impedance thereof.

A still further object is to provide a circuit as in the next preceding object in which the reactive and capacitative impedance of the condenser and direction control field coils substantially match the impedance of the tube.

Other objects of the invention will in part be apparent and will in part be obvious to those of ordinary skill in the art to which the invention pertains, from the following description and drawings.

The invention comprises an amplifier 15 provided with an input box J2 which includes plug and socket assemblies, a J3 output plug and socket assembly and a barrier or terminal strip J1, to which may be connected a sensing means 16 for supplying a variable input voltage to the J2 box. The J3 assembly provides for connecting a reversing motor 17 to the output of the amplifier and to the J2 box.

The J2 box, as described infra, contains or houses the fixed components of the input means for the amplifier and these components may comprise the fixed elements of a Wheatstone bridge or potentiometer.

The J2 and J3 assemblies, as constructed, include multipronged or pinned plugs and matching sockets so that the J3 plug assembly and the J2 box may be plugged into their respective sockets, the same having been properly interconnected in advance to meet the requirements of the type of input circuit involved.

The J1 assembly comprises a plurality of insulated contact terminals 19–23, inclusive, to selected ones of which the variable condition sensing means and the J2 box may be connected.

The variable condition input sensing means 16 may be any one of many different types, several of which are shown as follows: A conductivity cell 24 (FIGS. 2, 3, 4 and 5); a D.C. potentiometer means 25 to which a variable voltage is supplied at 26 (FIG. 8); an A.C. bridge input means 27 (FIG. 10), and an A.C. transmitter input means 27′ (FIG. 11).

Figures 1, 2, 3:
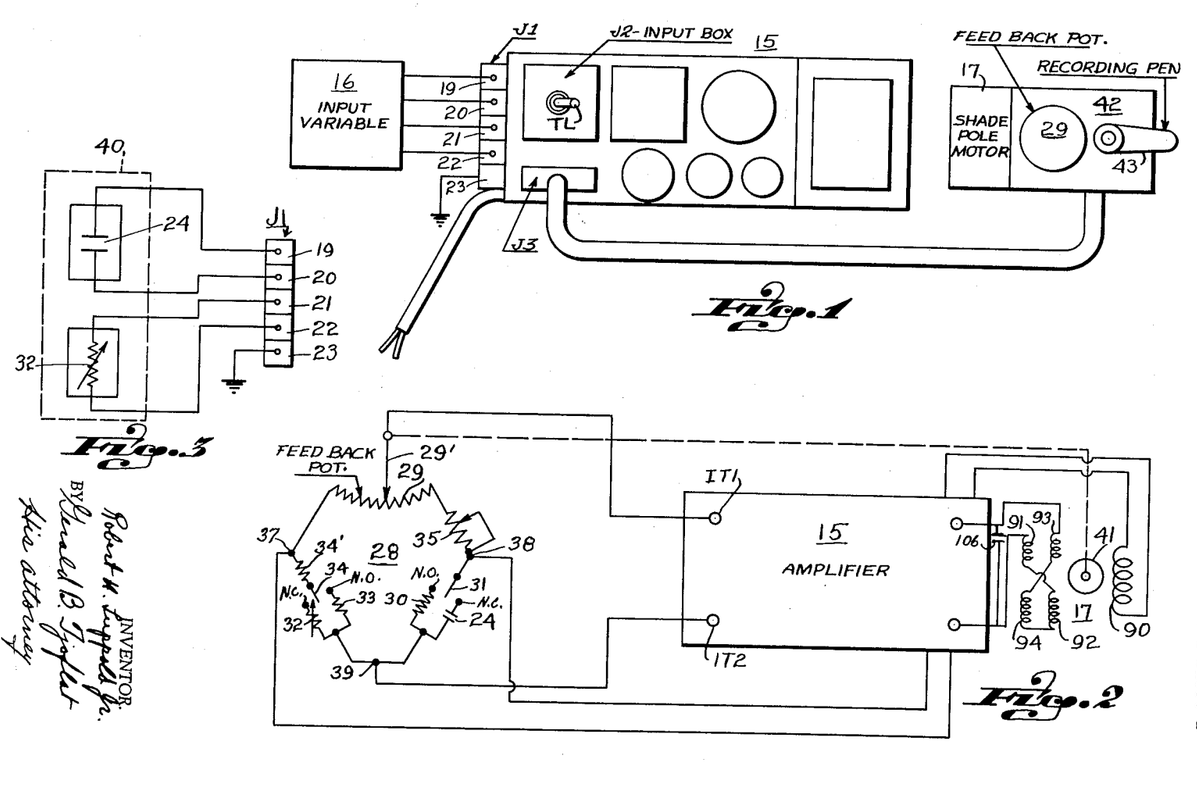
FIGURE 1 is a more or less diagrammatic view in front elevation of a chassis containing an electronic amplifier circuit provided with a barrier or terminal strip to which a variable electric input means may be connected, an input plug and socket assembly connected to the barrier strip, a reversing motor and feed-back potentiometer assembly, and an output plug and socket assembly for connecting the direction control field coils to the amplifier output and to the input plug and socket assembly, all arranged and constructed in accordance with an embodiment of the invention.
FIG. 2 is a more or less diagrammatic view of an amplifier, a reversing and feed-back potentiometer driving motor and a Wheatstone bridge the fixed elements of which are contained in the input box assembly of FIG. 1, and a conductivity cell that constitutes the variable input, all interconnected in accordance with the invention.
FIG. 3 is a diagrammatic view of a conductivity cell and thermistor (a temperature compensating resistor) connected to the barrier strip shown in FIG. 1, and constituting the external and condition responsive part of the bridge of FIG. 2.

FIGURE 2 illustrates schematically the conductivity cell 24 as part of a Wheatstone bridge 28 connected to constitute the input for the amplifier and interconnected with a feed-back potentiometer 29 having a slide contact 29′ driven by the motor 17.

Three branches of the bridge 28 comprise the conductivity cell 24, a calibrated or checking resistor 30 and a selector switch 31; a thermistor 32 (a resistor whose resistance changes with temperature in such a direction as to nullify the effects of temperature change on the balance of the bridge); a calibrated or checking resistor 33 and a selector switch 34; and adjustable resistor 35 having a slide contact that is positioned by a spindle 35′, and the feed-back potentiometer resistor 29.

The selector switches 31 and 34 may be combined as a single unit and operated by a lever TL from the normally closed contacts N.C. thereof to the N.O. contacts; the selector switches being in normally closed position.

A low voltage, for example, 5 volts, is supplied to the input terminals 37 and 38 of the Wheatstone bridge 28 and the output voltage thereof is supplied as input voltage to the amplifier 15 from the bridge output terminal 39 and the slide contact 29′.

The conductivity cell 24 and the thermistor 32 are located in a tank or vessel 40 containing a solution, the conductivity of which changes. Change in conductivity unbalances the bridge 28 and changes the input voltage to the amplifier 15. The resulting change in the output of the amplifier causes the armature 41 of the motor 17 to rotate in one direction or the other, and shifting the slide contact 29′ along the feed-back potentiometer 29 until the bridge is rebalanced. The motor 17 may also drive a recorder 42 provided with an indicator or pen arm 43 for tracing the conductivity values on a chart (not shown), or for visually indicating the instantaneous values of the conductivity.

Figure 4:
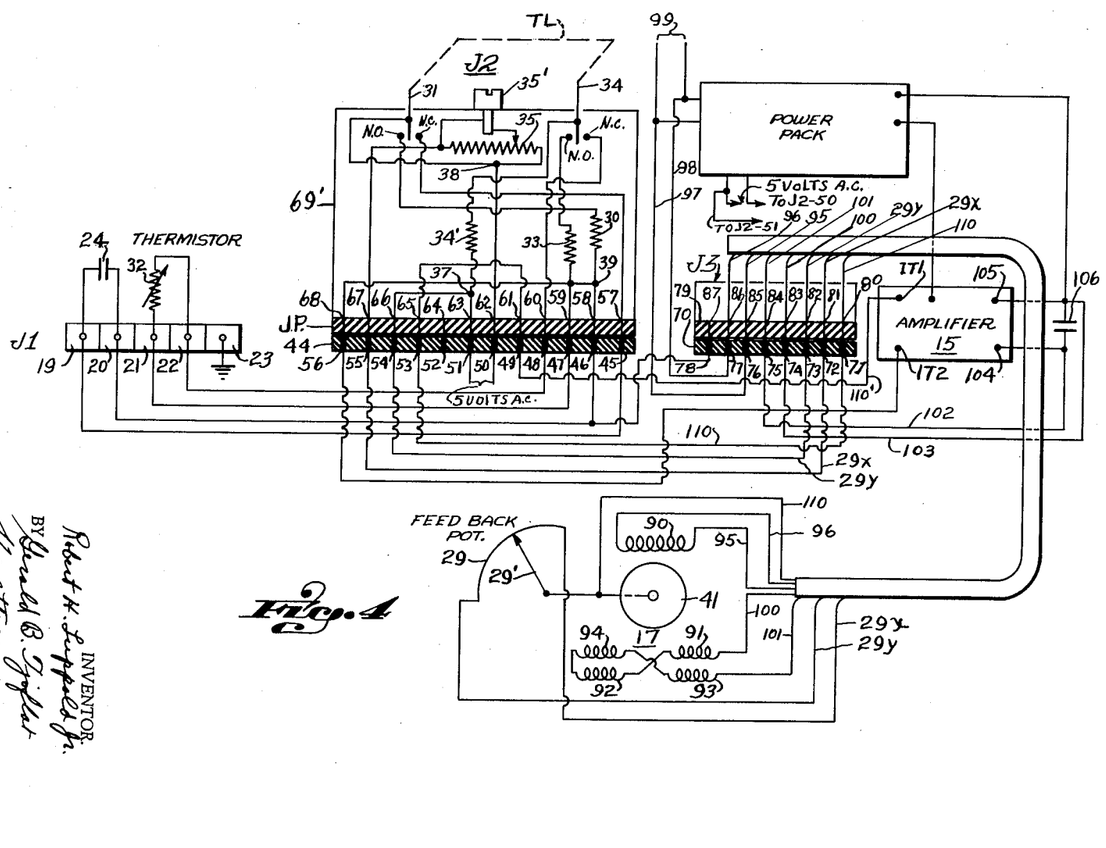
FIG. 4 is a more or less detailed developed view, (schematic in part) of the input and output plug and socket assemblies, a conductivity cell and a feed-back potentiometer drive motor, the view illustrating the interconnection of the sockets of the two plug and socket assemblies, the motor and the conductivity cell, the input box assembly containing the fixed elements of the Wheatstone bridge, some of which may be adjustable, for the purpose of adjusting the bridge for proper operating performance.
Figure 5:
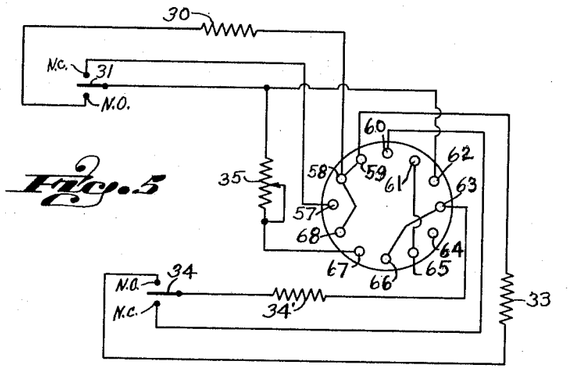
FIG. 5 is a schematic view of the plug part of the input box of FIG. 4 showing the interconnection of certain of the pins and the various fixed elements of the bridge to the pins.

The J1 barrier strip includes five terminals to which the input means is connected. As shown in FIGS. 3 and 4, the conductivity cell 24 is connected to terminals 19 and 20 and the thermistor 32 is connected to the terminals 21 and 22 of the J1 terminal strip. The respective terminals 19-22 are connected to selected socket terminals of the J2 box.

The J2 Input Box Assembly

The J2 assembly comprises a base or socket member 44 having a plurality of socket terminals 45-56 and a plug JP having a corresponding number of contact pins 57-68. The base or socket member 44 is mounted on the amplifier chassis in a suitable location.

The J2 assembly also includes a case or housing 69 within which are housed the fixed, although some may be adjustable, components of the bridge or potentiometer, these components being identified by the reference characters as applied to the bridge elements of FIG. 2. These components are supported by conductors that are soldered or otherwise appropriately secured to selected plug pins or terminals as shown.

The J3 Plug and Socket Assembly

The J3 assembly comprises a base or socket member 70 having a plurality of socket terminals 71-78 and a plug 79 having a corresponding number of terminal pins 80-87. The J3 socket member 70 is mounted on the amplifier chassis in a suitable location preferably close to the J2 socket member location.

Selected socket terminals of the J3 base or socket member 70 are connected to selected socket terminals of the J2 socket member 44 and other terminals thereof are connected to the output terminals of the amplifier 15. Selected terminals of the J3 plug 79 are connected to the reversing potentiometer drive motor and to the feed-back potentiometer 29.

Thus, through the interconnections of the J1 terminals to the J2 base or socket terminals and the interconnections of the J3 and J2 socket members, the amplifier is properly connected to function with a conductivity cell bridge and a reversing motor that drives the slide contact 29′ of the feed-back potentiometer.

With specific reference to FIG. 4, it is seen that the J2 socket member 44 has twelve terminals 45-56, both inclusive, and the plug thereof has the same number of pins 57-68, both inclusive. The J1 terminals 19-22 are connected to the J2 socket terminals 45-48, respectively. The J2 socket terminals 49 and 56 are connected to the input terminals IT1 and IT2 of the amplifier, the J2 socket terminals 53-55 are connected to the J3 socket terminals 71, 73 and 72, respectively.

The J2 socket terminal 46 is connected to J3 socket terminal 78 and the J2 socket terminals 50 and 51 are disposed for connection to a low voltage supply, say five volts, derived from a low voltage transformer winding (not shown) located in the amplifier chassis. The potentiometer 29 is connected by conductors 29x and 29y to the J3 terminals 81, 72 and 82, 73 to the J2 terminals J2 55, 67 and J2 54, 66 respectively. The slide contact 29 is connected by conductor 110 to amplifier terminal IT1 through J3 contacts 80-71, and J2 contacts 53, 65 and 61, 49 and conductor 110′.

The Reversing Motor

The reversing motor 17 comprises the armature 41, a main field winding 90 and rotation direction control field coil windings 91, 92 and 93, 94. The shaft of the motor drives the slide contact 29′ along the feed-back potentiometer resistor 29.

Figure 12:
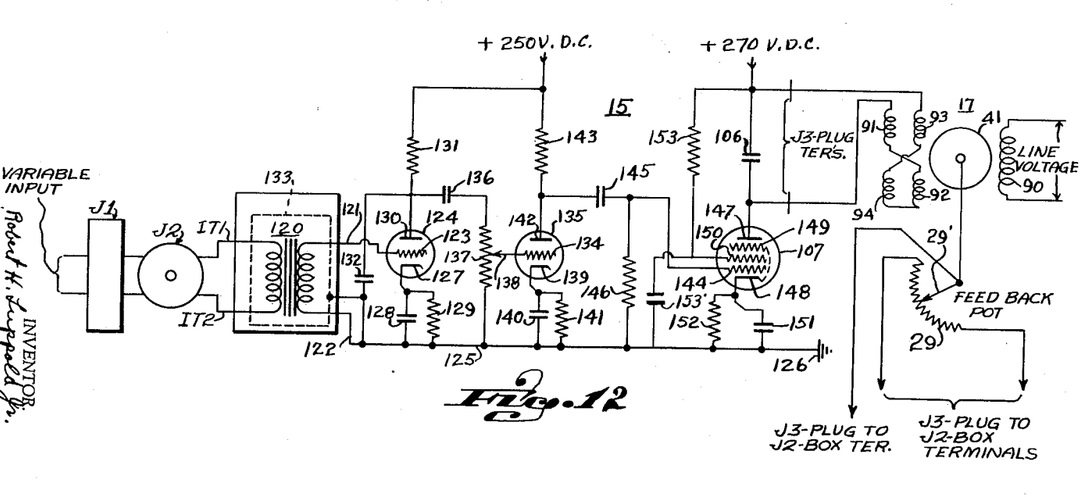
FIG. 12 is a schematic illustration of the circuit of the amplifier, the feed-back potentiometer and the driving motor therefor.

The main field winding 90 is connected by conductors 95, 96 to the J3 plug terminals pins 85 and 86, respectively. Those pins are connected through the socket terminals 76 and 77 of the J3 and conductors 97 and 98 to the power supply voltage indicated at 99. That voltage may be standard 115 volts, and serves also, to supply the "power pack" of the amplifier. The coil windings 91—92 and 93—94 are series connected with respect to each other and by conductors 100, 101 to the J3 plug terminals 83, 84 and thence from the socket terminals in which those plugs are received, through conductors 102, 103 to the output terminals 104, 105 of the amplifier. A condenser 106 is connected in parallel circuit with the series connected coil windings 91-94, so that, as shown in FIG. 12, the condenser and the said field coil windings form a parallel circuit that constitutes the load impedance for and substantially matching the impedance of the amplifier tube 107.

Operation of the Conductivity Cell Circuit

The operation of the conductivity cell bridge circuit of FIGS. 2, 3, 4 and 5 is described in the following reference being made also to FIG. 12.

As changes occur in the conductivity of the solution in which cell 24 is immersed, the output of the amplifier 15 as delivered to the load impedance 91-94 and 106 changes. When the conductivity decreases (the resistance of the solution then increasing), the bridge unbalance requires the slide contact 29′ to move to the left in FIG. 2 or counterclockwise in FIGS. 4 and 12.

The voltage change resulting from the decrease in conductivity passes into the J2 box and thence to a step up transformer 120. The output voltage at terminals 121 and 122 of the transformer is impressed on the grid 123 of a detector tube 124. The transformer terminal 122 is also connected to a conductor 125 which is grounded to the chassis at 126. The heated cathode 127 of tube 124 is connected to conductor 125 through an R.C. circuit comprising a condenser 128 of about five mfd. capacity and a resistor 129 of about 6,800 ohms.

The plate 130 of the tube is supplied with 250 volts +D.C. through a load resistor 131 of about 470,000 ohms, from the "power pack" as indicated in FIG. 4. A condenser 132 of about 0.01 mfd. capacity is connected from the plate 130 to conductor 125 and to a shield 133 in the transformer 120. The potential changes at the plate side of resistor 131 are impressed on a grid 134 of a tube 135, through a series R.C. circuit comprising a condenser 136 and a resistor 137 connected as shown, between the plate 130 and the conductor 125. The resistor 137 is connected to the grid 134 through a potentiometer slide contact 138.

The heated cathode 139 of tube 135 is connected to conductor 125 through a parallel R.C. circuit comprising a condenser 140 and a resistor 141. The plate 142 of tube 135 is supplied with 250 volts D.C.+ through a load resistor 143. Changes in potential on the plate side of load resistor 143 are impressed on a control grid 144 of tube 107 through a condenser 145. A resistor 146 is connected from the grid to the conductor 125 as shown.

The tube 107 may be of the 6AQ5 or GL6005 type. It includes a plate 147, a heated cathode 148, provided with a suppressor grid 149 and a screen grid 150. The cathode 148 is connected to the ground conductor 125 through a parallel R.C. circuit comprising a condenser 151 and a resistor 152. The grid 150 is connected to the supply voltage of 270 volts +D.C. through a resistor 153 and to ground conductor 125 through a condenser 153'.

The load impedance of tube 107 comprises the direction rotation control field coil windings 91–94 of the motor 17, and the condenser 106, the condenser and the coils 91–94 being connected to form a parallel R.C.L. circuit. The impedance of this R.C.L. circuit substantially matches the impedance of tube 107.

Since the motor field winding is energized with line voltage at substantially constant value, winding 90 provides an alternating current field of substantially fixed magnitude. The coil windings 91–94 being energized in accordance with variations in the plate current of tube 107 will cause the motor to be at rest when the bridge circuit is in balance.

The motor armature 41 will rotate in one direction or the other according to the magnitude of the current in the plate circuit of tube 107 and the phase relation of the field produced by the windings 91–94 and condenser 106 with reference to the field of the A.C. winding 90. In other words, if the current in the coils 91–94 is in phase with the field of main field winding 90, rotation of the motor armature 41 will be in one direction. If the current in the coils 91–94 shifts 180 degrees with respect to the current in the main field winding 90, rotation will be in the opposite direction.

The amplitude of the current in windings 91–94 determines the angular velocity of the rotation of the armature 41. The motor armature 41 will be at rest when the alternating current in the coil windings 91–94 is zero, or when any amount of direct current flows in the same.

By utilizing a R.C.L. circuit comprising the coil windings 91–94 and the condenser 106, as the load impedance of the tube 107, a highly desirable and effective load impedance results for the following reasons: The equivalent impedance of the inductance of the coils 91–94 in parallel with condenser 106, provides a good impedance match for the tube 107. That causes the A.C. component of the plate current in coils to be phased properly with respect to the current in the main field winding 90, thereby ensuring that the angular motion of the armature 41 will be equal in either direction of rotation for currents of equal amplitudes. Furthermore, as the tube current is essentially a time-varying, direct current, the alternating component is utilized to determine the direction of the rotation and the angular velocity of rotation. The direct component of the current is used also to develop dynamic damping in the motor, that is, the damping force which is proportional to the angular velocity of rotation. That characteristic acts as a stabilizing factor in the operation of the motor and prevents overshooting or over-travel in response to changes in input by the conductivity cell circuit or any other input circuit that may be utilized. Also because of the fact that the coils 91–94 are directly connected to the plate circuit of tube 107, it is unnecessary to employ an output transformer or any other impedance coupling device.

*J2 Input Box Provided With Transistor Choppers*

Figure 6:
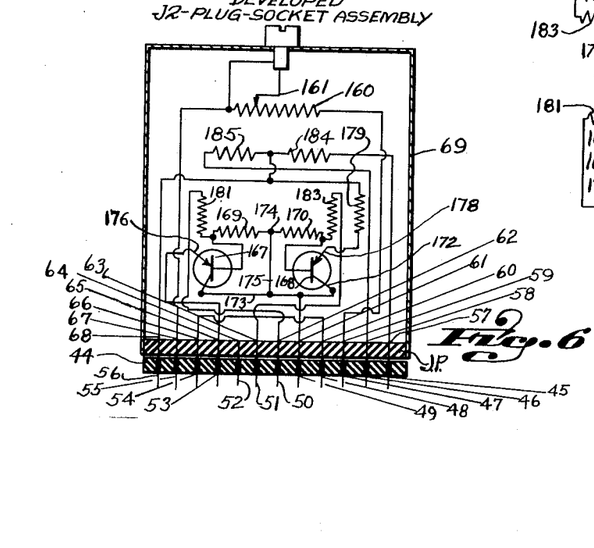
FIG. 6 is a view in section of an input box designed for use with a D.C. bridge, requiring a chopper, the fixed elements of the bridge and a transistor type chopper being housed in the input box.
Figure 7:
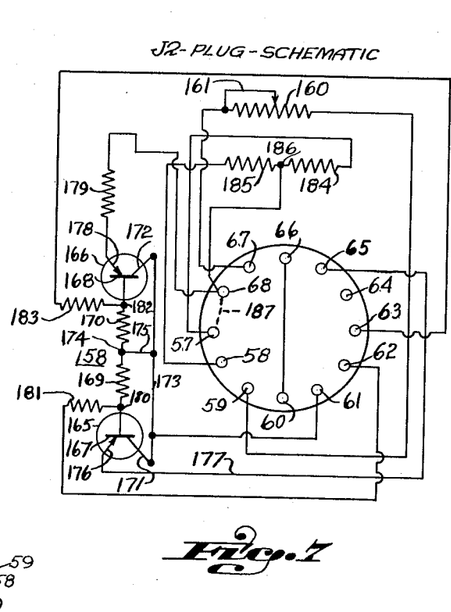
FIG. 7 is a schematic view showing the connections of the bridge and the chopper elements of FIG. 6 to the various pins of the input box plug of that assembly.
Figure 8:
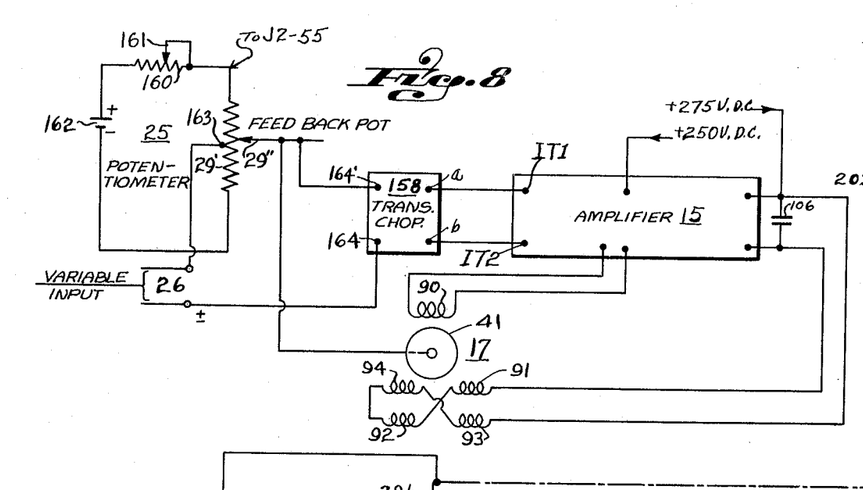
FIG. 8 is a schematic circuit embodying the D.C. bridge of FIGS. 6 and 7 and showing schematically the variable input means therefor.

In FIG. 6, a J2 input box is shown that contains the fixed elements of a variable input circuit utilizing the D.C. potentiometer means 25 of FIG. 8. Since the output voltage of means 25 is D.C. and the input 26 is D.C., a chopper 158 is required to convert the D.C. variable, which is the difference between the output and input voltages of means 25 and input 26, to an A.C. input voltage of the transformer 120 of FIG. 12. The J2 box of FIG. 6 includes the same socket base and plug members as in FIG. 4; therefore, the same reference characters of that view are applied to the socket and plug terminals of FIG. 6.

The fixed components of the potentiometer means 25 comprises a potentiometer resistor 160 provided with a slide contact 161 and a battery 162 (FIG. 8) that is connected to the J1 barrier strip and thence to the J2 input terminals of the base or socket member 44. The motor driven feed-back potentiometer 29' is connected in series with potentiometer 160 across the battery or cell 162.

A variable D.C. voltage 26 whose magnitude is representative of a condition to be measured, recorded or controlled, is applied to approximately the midpoint 163 of potentiometer 29' and to input terminal 164 of the chopper 158. The slide contact 29'' is connected to terminal 164' of the chopper. The chopper may be of conventional form or, as shown, it may be a transistor chopper. The output terminals (a) and (b) of the chopper are connected to the input of transformer 120.

The transistor chopper comprises transistors 165 and 166, of the 2N109 type for example, having base terminals 167 and 168, respectively, connected to each other through resistors 169 and 170 of approximately 10 ohms each. Collectors 171 and 172 of the transistors are connected by a jumper 173, the latter being connected to the junction 174 of resistors 169—170 by a jumper 175. Emitter 176 of transistor 165 is connected by a connector 177 to J2 plug terminal 65 and emitter 178 of transistor 166 is connected through a resistor 179 to J2 plug terminal 68. The junction 180 between base contact 167 and resistor 169 of transistor 165 is connected through a resistor 181 to J2 plug terminal 62. Similarly, the junction 182 between the base contact 168 of transistor 166 and resistor 170 are connected through a resistance 183 to J2 plug terminal 63.

When full scale input voltage from the potentiometer means 25 to the transistor chopper 158 is above 1.3 volts, series connected resistors 184 and 185 are provided and connected to the J2 plug terminals 58 and 59, the junction 186 of those resistors being connected to the J2 plug terminal 68. The instrument is then a voltage receiver of 2000 ohms volt sensitivity. If a full scale voltage input is less than that indicated above, resistors 184 and 185 are omitted, in which case the J2 plug terminals 57 and 68 are connected by a jumper 187 as shown in dotted lines. The instrument is then a true potentiometer.

The variable D.C. input voltage which is the difference between the output voltage of means 25 and the variable input voltage 26 is supplied to J2 socket terminals 53 and 56 to which the input terminals of the transistors are connected and the output terminals of the transistors are connected to the J2 plug terminals 61 and 68 and by the mating socket terminals 49 and 56 to the amplifier input transformer terminals IT1 and IT2 (see FIGS. 8 and 12). It will be understood that the interconnections of the J3 plug and socket assembly to the J2 box are so made as to provide the operation required of motor 17 and its slide contact 29″ that will balance the output to the amplifier against the input thereof.

*The A.C. Bridge Transmitter of FIGS. 9, 10, and 11*

Figure 10:
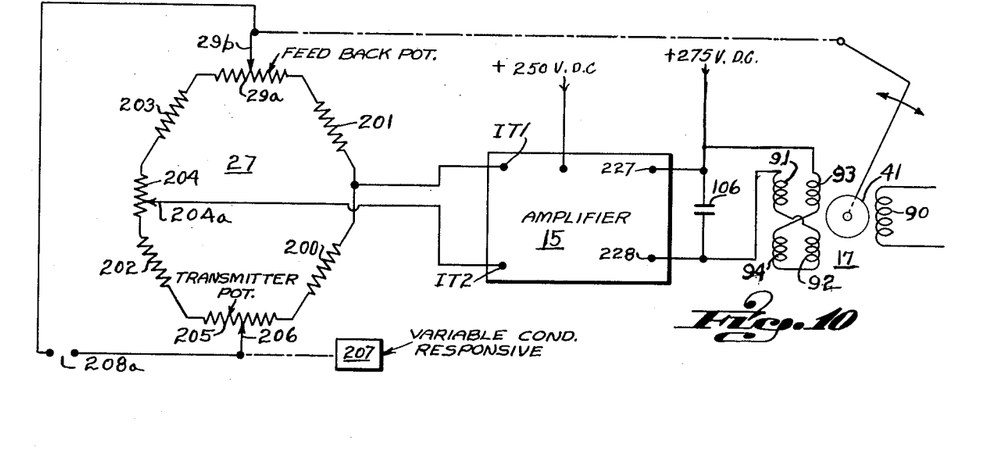
FIG. 10 is a schematic diagram of the amplifier having an A.C. bridge transmitter input means and a reversing motor for operating the feed-back potentiometer of the bridge.
Figure 11:
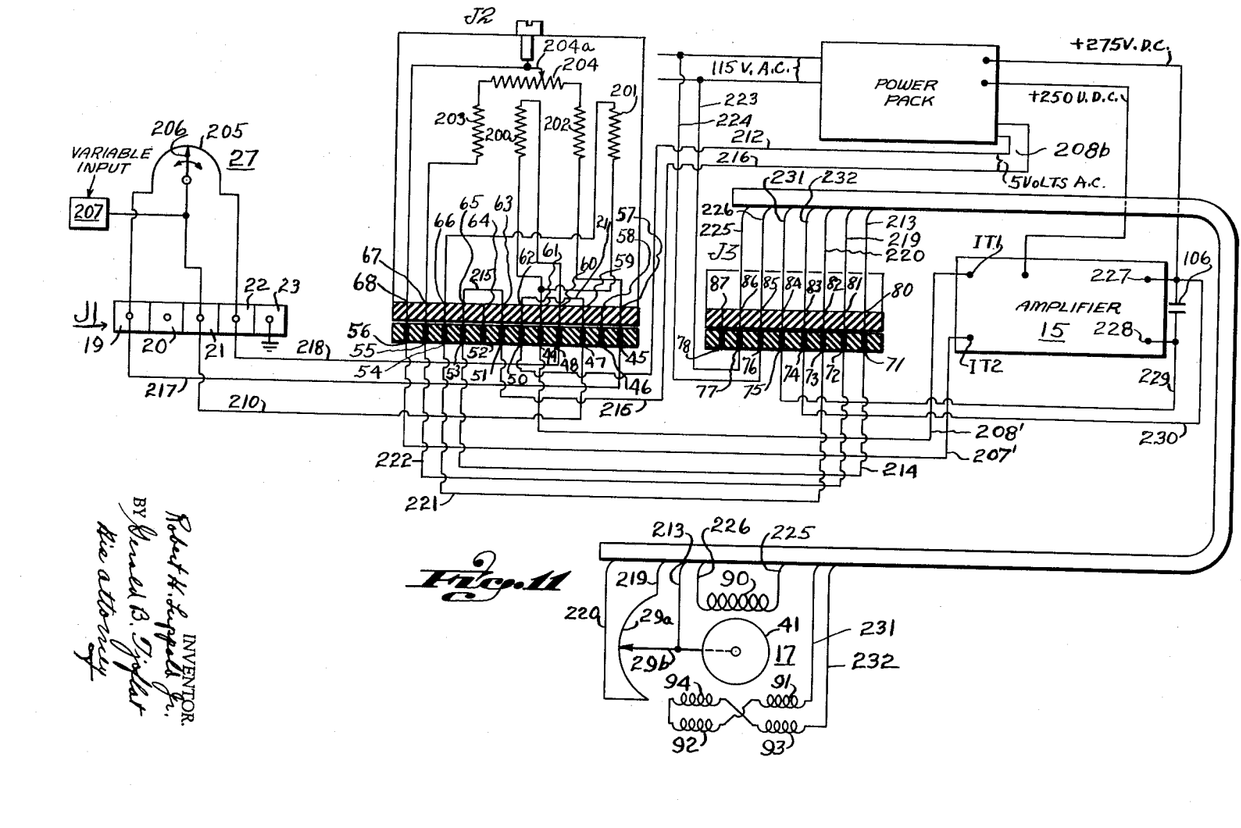
FIG. 11 is a more complete schematic view of the arrangement of FIG. 10, showing the amplifier, the output and input plug and socket assemblies interconnected with the A.C. transmitter potentiometer input means.

In FIG. 10 there is illustrated the amplifier 15, the motor 17 with its feed-back potentiometer 29a and driven slide contact 29b. The bridge balancing potentiometer 29a is included in the A.C. bridge transmission system 27 comprising fixed resistors 200, 201, 202 and 203 and a bridge adjusting resistor 204 having a slide contact 204a. The bridge includes also a potentiometer 205 having a slide contact 206 that is actuated by a variable condition responsive actuator 207. The actuator 207 may be responsive to temperature, pressure or any other factor that is to be the subject of measurement, control or recording. A relatively low bridge input voltage having a value of five volts for example, is supplied at 208a through the J2 box and is impressed on the same through the slide contacts 29b and 206. The output voltage of the bridge is supplied to the input terminals of the amplifier, i.e. the terminals by which input voltage is impressed on the transformer 120 of FIG. 12.

The motor 17 is connected to the amplifier in the manner shown and described in connection with FIG. 12. The armature 41 of that motor drives the slide contact 29b of the transmitter bridge 27. When the slide contact 206 is moved along the potentiometer 205 in one direction, the output of the amplifier 15 causes the motor 17 to operate in a direction to actuate slide contact 29b in the same direction until the bridge is again balanced.

Figure 9:
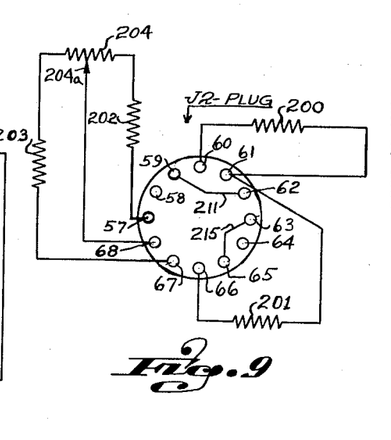
FIG. 9 is a schematic illustration of the input box plug and the fixed components of the bridge shown in FIG. 10.

FIG. 9 illustrates schematically the J2 plug assembly and the connections of the fixed bridge resistors 200–203, and adjustable resistor 204 with its contact 204a, to the selected terminal pins of the plug.

FIG. 11 shows that the plug is connected by pins 68 and 61 through their mating socket terminals to the amplifier input terminals IT1 and IT2 by conductors 207′ and 208′, and that a voltage source 208b is connected to slide contacts 206 and 29b as follows: Contact 206 is connected to J1 terminal 21 which in turn is connected by a conductor 210 to socket and plug terminals J2–47, 59, jumper 211 to plug and socket terminals J2–62, 50 and conductor 212 to one side of the source 208b. Contact 29b is connected to the other side of voltage source 208b by conductor 213 to plug and socket terminals J3–80 and 71, conductor 214 socket and plug terminals J2–53, 65, jumper 215, plug and socket terminals J2–65, 51 and conductor 216 to the source 208b.

One side of potentiometer 205 is connected to terminal J1–19 through conductor 217, socket and plug terminals J2–45, 57 to resistor 202. The other side of potentiometer 205 is connected to terminal J1–22 and through conductor 218 and the socket and plug terminals J2–48, 60 to resistor 200.

Potentiometer 29a is connected by conductors 219, 220 to socket and plug terminals J2–54, 66 and 55, 67, respectively, through plug and socket terminals J3–81, 72 and 82, 73 and conductors 221 and 222.

Main field winding 90 of motor 17 is connected across the 115 volt supply source by conductors 223, 224, socket and plug terminals J3–77, 86 and 76, 85, and conductors 225 and 226, respectively. The direction control field coil windings 91–94 are connected to the amplifier output terminals 227 and 228 through conductors 229 and 230, socket and plug terminals J3–74, 83 and 73, 82 and conductors 231 and 232.

The amplifier 15 is constructed as in FIG. 12 and operates in the manner described supra. Thus the bridge unbalance produced by changes in position of the transmitter slide contact 206 produces a change in voltage input to the amplifier 15 with a corresponding change in its output to the direction control field coil-condenser load impedance on tube 107. That change causes motor 17 to shift the slide contact 29b in the direction required to restore balance.

Having thus described the invention, it will be apparent to those of ordinary skill in the art to which the invention pertains that various changes and modifications may be made in the illustrated embodiments without departing from either the spirit or the scope of the invention.

Therefore, what is claimed as new and desired to be secured by Letters Patent is:

1. A dampened servo control free from undesirable hunting comprising a reversing motor having a separately excited A.C. main field winding receiving a first fixed A.C. current and a set of four spaced rotation direction control shading windings, the motor being of the type in which a selected pair of diagonally arranged windings are normally connected in a closed loop circuit with additive polarity to produce rotation of the motor in one direction or the other and a current output means imposing on said spaced direction control shading windings, a D.C. current having an A.C. component, said A.C. component being in one of two phase relationships with the fixed A.C. current, which phases are 0° and 180° respectively to said fixed current.

2. A dampened servo control free from undesirable hunting for controlling a variable member comprising a reversing motor having a separately excited A.C. main field winding receiving a first fixed A.C. current and a set of four spaced rotation direction control shading windings, the motor being of the type in which a selected pair of diagonally arranged windings are normally connected in a closed loop circuit with additive polarity to produce rotation of the motor in one direction or the other, connections between said motor and the variable member whereby said member moves with the motor, and a current input means controlled by the variable member imposing on said spaced direction control shading windings, a second variable A.C. component imposed upon a D.C. current, said component being in one of two phase relationships with the fixed A.C. current which phases are 0° and 180° respectively to said fixed current.

3. A dampened servo control free from undesirable hunting comprising in combination an electronic tube having a plate, cathode and control grid and a load impedance in the plate circuit therefor, a reversing motor having a separately excited A.C. main field winding receiving a first fixed A.C. current and a set of four spaced rotation direction control shading windings and a condenser connected in parallel with said control shading winding, the motor being of the type in which a selected pair of diagonally arranged windings are normally connected in a closed loop circuit with additive polarity to produce rotation of the motor in one direction or the other the impedance of said parallel circuit being substantially equal to the impedance of the tube and connected to constitute the load impedance thereof whereby the shading windings receive a second A.C. component imposed upon a D.C. current.

4. A dampened servo control free from undesirable hunting comprising in combination an electric amplifier having a variable condition input means and a feed back balancing potentiometer in circuit with the input means, a reversing motor having a separately excited A.C. main field winding receiving a first fixed A.C. current, and a set of four spaced rotation direction control shading windings, the motor being of the type in which a selected pair of diagonally arranged windings are normally connected in a closed loop circuit with additive polarity to produce rotation of the motor in one direction or the other said control field coil windings being connected directly to the output of the amplifier and constituting load impedance therefor whereby said control field windings receive a second A.C. component imposed upon a D.C. current which operates the motor in one direction or the other according to the phase of the current in the control field windings with respect to the main field windings and dampened to be arrested when the input means is balanced by said feed back potentiometer.

5. A dampened servo control as claimed in claim 4 where the amplifier output includes a multi element tube whose load impedance includes the direction control shading windings of said motor and in which a resistor connects the plate voltage to a grid of said tube whereby the D.C. to the control field windings is adjusted.

References Cited in the file of this patent

UNITED STATES PATENTS

| | | |
|---|---|---|
| 2,234,349 | MacKay | Mar. 11, 1941 |
| 2,379,689 | Crosby | July 3, 1945 |
| 2,380,947 | Crosby | Aug. 7, 1945 |
| 2,423,480 | Caldwell | July 8, 1947 |
| 2,440,600 | Crosby | Apr. 27, 1948 |
| 2,466,591 | Jacobson | Apr. 5, 1949 |
| 2,514,246 | Knox | July 4, 1950 |
| 2,530,642 | Yardeny et al. | Nov. 21, 1950 |
| 2,544,790 | Hornfeck | Mar. 13, 1951 |
| 2,655,426 | Barnes | Oct. 13, 1953 |
| 2,801,799 | McCollock | Aug. 6, 1957 |
| 2,924,763 | Cibelius | Feb. 9, 1960 |